United States Patent
Kaise et al.

(10) Patent No.: US 8,451,381 B2
(45) Date of Patent: May 28, 2013

(54) EXCELLENTLY OPERABLE PROJECTION IMAGE DISPLAY APPARATUS

(75) Inventors: Naoki Kaise, Ritto (JP); Kazunori Kodama, Osaka (JP); Toshiyuki Watanabe, Osaka (JP); Takeshi Fujisaki, Amagasaki (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 303 days.

(21) Appl. No.: 12/882,958

(22) Filed: Sep. 15, 2010

(65) Prior Publication Data

US 2011/0069234 A1 Mar. 24, 2011

(30) Foreign Application Priority Data

Sep. 18, 2009 (JP) ................................. 2009-216990

(51) Int. Cl.
 *H04N 5/00* (2006.01)
(52) U.S. Cl.
 USPC ........... 348/607; 348/580; 348/581; 348/582; 348/583
(58) Field of Classification Search
 USPC ........................................................ 348/607
 See application file for complete search history.

(56) References Cited

U.S. PATENT DOCUMENTS

| | | | |
|---|---|---|---|
| 6,652,104 B2 * | 11/2003 | Nishida et al. | 353/70 |
| 6,877,863 B2 * | 4/2005 | Wood et al. | 353/70 |
| 7,070,283 B2 * | 7/2006 | Akutsu | 353/69 |
| 7,182,466 B2 * | 2/2007 | Sunaga | 353/70 |
| 7,270,421 B2 * | 9/2007 | Shinozaki | 353/69 |
| 7,359,575 B2 * | 4/2008 | Bassi et al. | 382/276 |
| 2002/0051095 A1 * | 5/2002 | Su | 348/745 |
| 2002/0122161 A1 * | 9/2002 | Nishida et al. | 353/70 |
| 2003/0189675 A1 | 10/2003 | Itaki | |
| 2003/0210381 A1 * | 11/2003 | Itaki | 353/70 |
| 2005/0046803 A1 * | 3/2005 | Akutsu | 353/69 |
| 2005/0073661 A1 * | 4/2005 | Tamura | 353/70 |
| 2005/0151934 A1 * | 7/2005 | Akutsu | 353/69 |
| 2005/0237492 A1 * | 10/2005 | Shinozaki | 353/69 |
| 2007/0285626 A1 * | 12/2007 | Miyasaka | 353/85 |

(Continued)

FOREIGN PATENT DOCUMENTS

JP 2008079016 4/2008

OTHER PUBLICATIONS

European Search Report issued on Mar. 9, 2011 in the corresponding European Patent Application No. 10009725.2-220212302937.

*Primary Examiner* — Nasser Goodarzi
*Assistant Examiner* — Michael B Pierorazio
(74) *Attorney, Agent, or Firm* — NDQ&M Watchstone LLP

(57) ABSTRACT

A image distortion correction unit which corrects a distortion of a projected image includes: a switching unit which operates in response to an operation signal from a Keystone remote controller button to switch correction by a trapezoidal distortion correction process and correction by a corner distortion correction process back and forth; a determination unit which determines whether any one of the correction by the trapezoidal distortion correction process and the correction by the corner distortion correction process has been performed; and a prohibition unit which prohibits switching the trapezoidal distortion correction process and the corner distortion correction process back and forth if the determination unit determines that any one of the correction by the trapezoidal distortion correction process and the correction by the corner distortion correction process has been performed and the operation signal is also received from the Keystone remote controller button.

3 Claims, 9 Drawing Sheets

U.S. PATENT DOCUMENTS

| | | | |
|---|---|---|---|
| 2009/0278999 A1* | 11/2009 | Ofune et al. | 348/745 |
| 2010/0002123 A1* | 1/2010 | Nozaki et al. | 348/333.1 |
| 2010/0045942 A1* | 2/2010 | Furui | 353/69 |
| 2011/0210979 A1* | 9/2011 | Furui | 345/619 |
| 2011/0234994 A1* | 9/2011 | Uchiyama | 353/70 |
| 2011/0285971 A1* | 11/2011 | Oka | 353/70 |

* cited by examiner

EXCELLENTLY OPERABLE PROJECTION IMAGE DISPLAY APPARATUS

This nonprovisional application is based on Japanese Patent Application No. 2009-216990 filed on Sep. 18, 2009, with the Japan Patent Office, the entire contents of which are hereby incorporated by reference.

BACKGROUND OF THE INVENTION

1. Field of the Invention

The present invention relates generally to projection image display apparatuses and particularly to projection image display apparatuses having a function correcting a distortion of an image displayed on a projection surface.

2. Description of the Related Art

Projection image display apparatuses (hereinafter also referred to as projectors) may cause a so called image distortion. More specifically, between the optical axis of light projected by a projector and a screen or a similar projection surface, there may be a relative inclination, and accordingly, an image projected on the projection surface may distort at least in one of horizontal and vertical directions.

A projector having a correction function for correcting such image distortion is currently studied. More specifically, it is a projector that is switchable for example between performing a correction based on operating a key (i.e., manual correction), and detecting an angle of the projector, as disposed, and performing a correction based on the detected angle (i.e., automatic correction).

The above projector has a first trapezoid correction key operated to correct a projected image's trapezoidal distortion in a predetermined direction, and a second trapezoid correction key operated to correct the projected image's trapezoidal distortion in a direction opposite to that associated with the first trapezoid correction key. When the first or second trapezoid correction key is operated, a manual correction process is performed, whereas when the first and second trapezoid correction keys are operated, an automatic correction process is performed.

The above projector allows manual correction and automatic correction to be switched back and forth without the necessity of operating an otherwise separately provided, switching key. The projector can thus provide enhanced operability in switching manual correction and automatic correction back and forth.

Simply operating the first and second trapezoid correction keys to switch manual correction and automatic correction back and forth, however, may switch manual correction and automatic correction back and forth against the user's intention if the user operating a console panel inadvertently presses the first or second trapezoid correction key.

For example, if the automatic correction process is currently performed, and the first trapezoid correction key is inadvertently pressed, then the automatic correction process so far performed is stopped (or reset) and switched to manual correction, and the user must perform an operation once again from the beginning to correct distortion.

SUMMARY OF THE INVENTION

The present invention contemplates a projection image display apparatus having an image distortion correction function that can resolve failure and cumbersomeness associated with the user's inadvertent operation.

The present invention in one aspect provides a projection image display apparatus including: an image signal processing unit which receives and converts a first image signal to generate a second image signal representing an image to be projected; an image distortion correction unit which adjusts the second image signal to correct a distortion of a projected image; and an input operation unit which operates in response to an operation done by a user to output an operation signal associated with an image distortion correction process. The image distortion correction unit includes: a first image distortion correction unit which adjusts the second image signal responsively when a correction point on the projected image is changed; a second image distortion correction unit which adjusts the second image signal responsively when an angular parameter associated with a projection angle of the projection image display apparatus is changed; a switching unit which operates in response to a first operation signal output from the input operation unit to switch correction provided by the first image distortion correction unit and correction provided by the second image distortion correction unit back and forth; a determination unit which determines whether any one of the correction by the first image distortion correction unit and the correction by the second image distortion correction unit has been performed; and a prohibition unit which prohibits switching the first image distortion correction unit and the second image distortion correction unit back and forth if the determination unit determines that any one of the correction by the first image distortion correction unit and the correction by the second image distortion correction unit has been performed and the first operation signal is also received from the input operation unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Hereinafter reference will be made to the drawings to describe the present invention in embodiments. In the figures, identical or corresponding components are identically denoted and will not be described repeatedly in detail.

Figure 1:
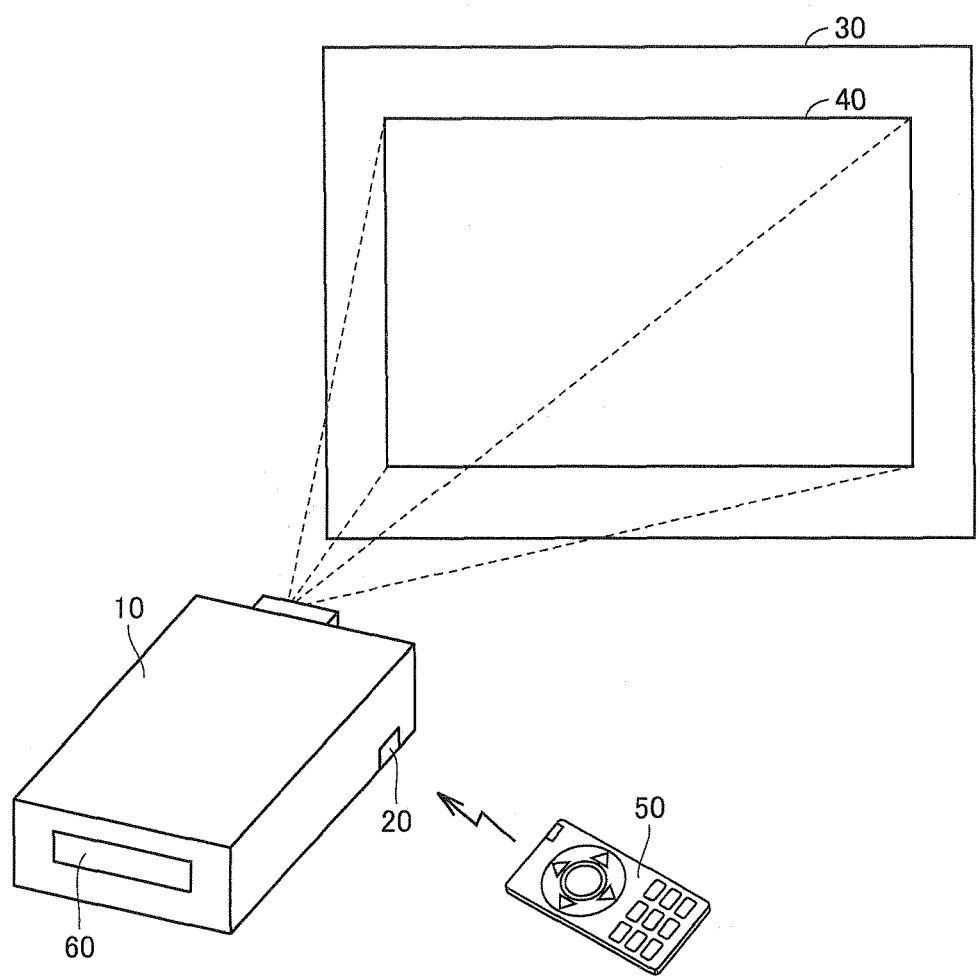
FIG. 1 schematically shows a configuration of a projection image display apparatus according to an embodiment of the present invention.

FIG. 1 schematically shows a configuration of a projection image display apparatus according to an embodiment of the present invention.

With reference to FIG. 1, the present embodiment provides a projection image display apparatus (hereinafter also referred to as a projector) 10 that is a liquid crystal projector utilizing a liquid crystal device to project an image. It projects the light of an image that is displayed by the liquid crystal device on a screen 30 to display a projected image 40. The image may be projected on a surface other than screen 30; it may be projected on a wall surface.

Projector 10 includes a remote controller signal reception unit 20 receiving an infrared modulated, remote controller signal transmitted from a remote controller 50 operated by a user, and an input unit 60. The remote controller signal includes a command signal for remotely controlling projector 10. Input unit 60 includes an input port for receiving an image signal supplied from an external signal supply device (not shown). The signal supply device includes a digital signal supply device outputting digital signals of a digital versatile disc (DVD) reproduction device, a Blu-ray disc reproduction device or the like, and an analog signal supply device outputting an analog signal of a computer or the like.

Figure 2:
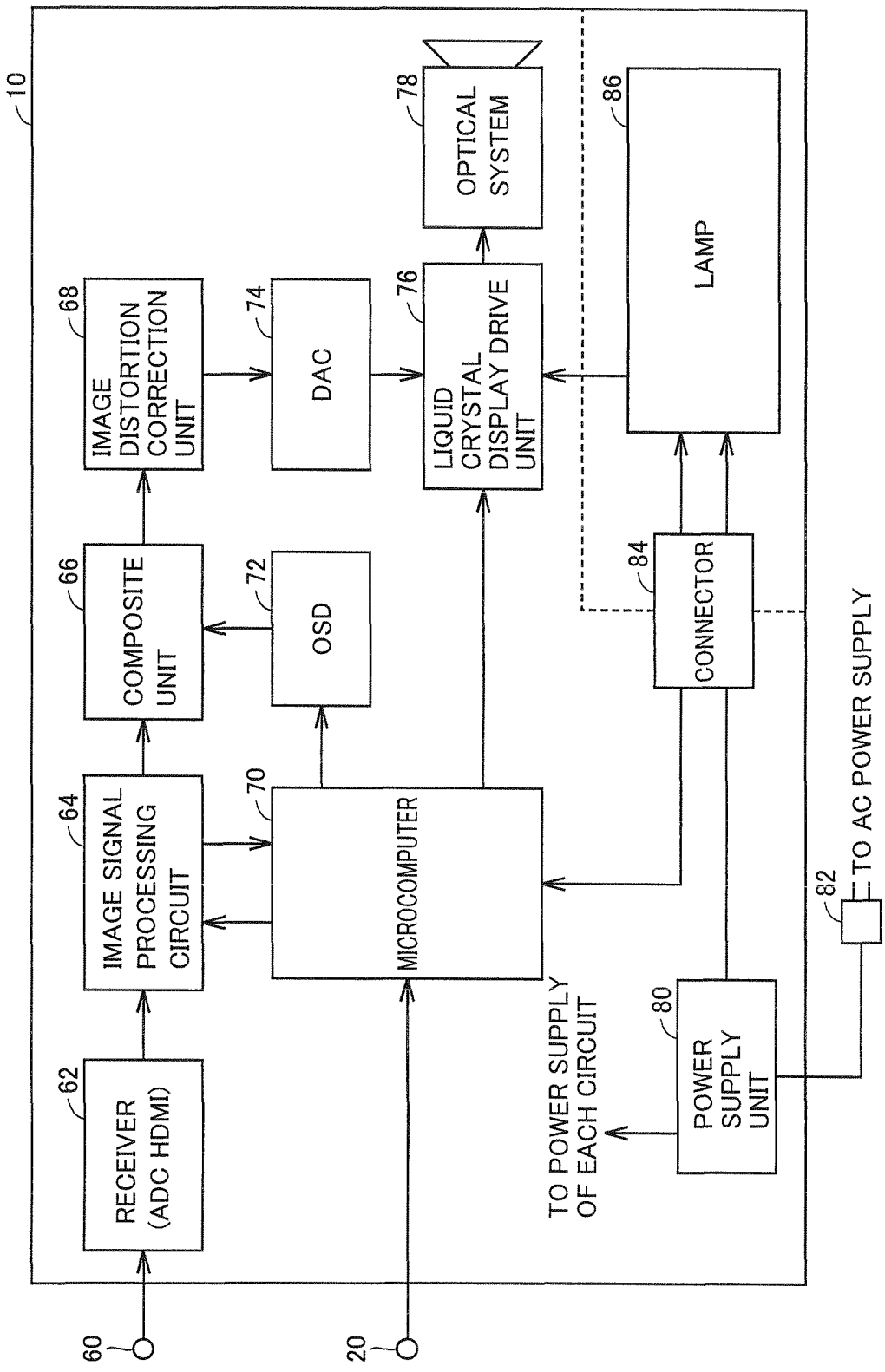
FIG. 2 shows a configuration of a projector shown in FIG. 1.

FIG. 2 shows a configuration of projector 10 shown in FIG. 1.

With reference to FIG. 2, projector 10 includes a receiver 62, an image signal processing circuit 64, a composite unit 66, an image distortion correction unit 68, a microcomputer 70, an on-screen-display (OSD) circuit 72, a digital analog converter (DAC) 74, a liquid crystal display drive unit 76, an optical system 78, a power supply unit 80, a connector 84, and a lamp 86.

Microcomputer 70 is operative in response to a command signal received from remote controller 50 via remote controller signal reception unit 20 to generate and output a control command to each component of projector 10.

Receiver 62 receives an image signal from input unit 60 and outputs the image signal. Receiver 62 has an analog digital converter (ADC) function converting a received analog image signal to a digital signal, and an authentication function and a decryption function following a high-bandwidth digital content protection (HDCP) system. The HDCP is used to implement encrypting data transmitted in accordance with high definition multimedia interface (HDMI). This can prevent image signals or the like contents transmitted on digital transmission lines from being maliciously copied. While in this scenario the digital transmission line is a line transmitting data and signals in accordance with the HDMI, it may be a transmission line in accordance with digital visual interface (DVI).

Image signal processing circuit 64 receives an image signal from receiver 62, processes the received signal into a signal for displaying, and outputs the processed signal. More specifically, image signal processing circuit 64 receives an image signal from receiver 62 and writes the signal to a frame memory (not shown) for each one frame (or screen), and also reads an image stored in the frame memory. In this writing and reading process, a variety of image processings are performed to convert a received image signal to generate an image signal, i.e., image data, for an image to be projected.

OSD circuit 72 follows an instruction received from microcomputer 70 to generate: characters and symbols representing a variety of statuses of projector 10; a menu image used in correcting image distortion, adjusting image quality, setting conditions for operations and the like; a pointer image, an underline image and other ornamental images; and the like (hereinafter collectively referred to as an "OSD image") as an OSD image signal, and output the signal to composite unit 66.

Composite unit 66 composites the OSD image signal and the image signal output from image signal processing circuit 64 to generate a composite image signal in the form of image data, and supplies the image data to image distortion correction unit 68.

Note that the OSD image signal is generated by OSD circuit 72 reading OSD data stored in OSD circuit 72 at a memory (not shown) as the user issues an instruction via remote controller 50 to display an OSD image. If the OSD image is not displayed, composite unit 66 does not perform the above described composite process, and the image data output from image signal processing circuit 64 is exactly supplied to image distortion correction unit 68.

Image distortion correction unit 68 corrects image distortion caused by relative inclination between the optical axis of light projected from projector 10 and a projection surface of screen 30. More specifically, image distortion correction unit 68 receives the composite image signal from composite unit 66 and adjusts the signal to generate an image signal representing an image having distortion corrected, and outputs the generated image signal to DAC 74.

Image distortion correction unit 68 has as image distortion correction functions a trapezoidal distortion correction function employing an angular parameter associated with a projection angle of projector 10 to form a distorted image on each liquid crystal panel that is provided to liquid crystal display drive unit 76 to correct a distortion of a projected image displayed on screen 30 and a corner distortion correction function forming a distorted image on each liquid crystal panel, as based on an amount of displacement corresponding to the user's operation and introduced at four corners of the projected image displayed on screen 30, to correct the projected image's distortion. These correction functions and a process for controlling how they are switched back and forth will be described later.

DAC 74 receives an image signal from image distortion correction unit 68, converts the received signal to an analog signal, and outputs the analog signal to liquid crystal display drive unit 76.

Liquid crystal display drive unit 76, optical system 78 and lamp 86 correspond to a projection unit controlled by microcomputer 70 to operate in response to the image signal output from DAC 74 to project an image on screen 30.

The projection unit operates, as will be described hereinafter. Lamp 86 serving as an illumination device is for example a supervoltage mercury lamp, a metal halide lamp, a xenon lamp or the like. Lamp 86 is detachably attached via connector 84 to projector 10. From lamp 86, light is substantially collimated and thus emitted to liquid crystal display drive unit 76.

Liquid crystal display drive unit 76 includes an optical system including a lens and a prism (not shown), and R, G, B liquid crystal panels. Liquid crystal display drive unit 76 receives light from lamp 86 and passes the light through its internal lens system (not shown), and the light is incident on each of the R, G, B liquid crystal panels such that a uniform distribution in quantity of light is achieved. Of the light incident via the lens system, light of a blue color wavelength band (hereinafter referred to as "B light"), light of a red color wavelength band (hereinafter referred to as "R light"), and light of a green color wavelength band (hereinafter referred to as "G light") are substantially collimated and thus incident on the R, G, B liquid crystal panels. Each liquid crystal panel is driven in accordance with an image signal corresponding to R, G, B provided from DAC 74, and modulates light in accordance with its driven status. The R light, G light, B light modulated by the liquid crystal panels are composited in color by a diachronic prism, and subsequently enlarged and thus projected by a projection lens on screen 30. The projection lens includes a group of lenses imaging projected light on screen 30, and an actuator for changing some of the lenses in the direction of the optical axis to adjust the projected image's zoomed and focused states.

Power supply unit 80 is supplied with power via a plug 82 plugged in a receptacle of an alternating current (AC) power supply (not shown), and supplies the received power to each component internal to projector 10.

The user can use remote controller 50 to input a variety of inputs. Remote controller 50 transmits a remote controller signal, which is in turn input via remote controller signal reception unit 20 to microcomputer 70 to perform a variety of processes corresponding thereto.

Image Distortion Correction Process

Figure 3:
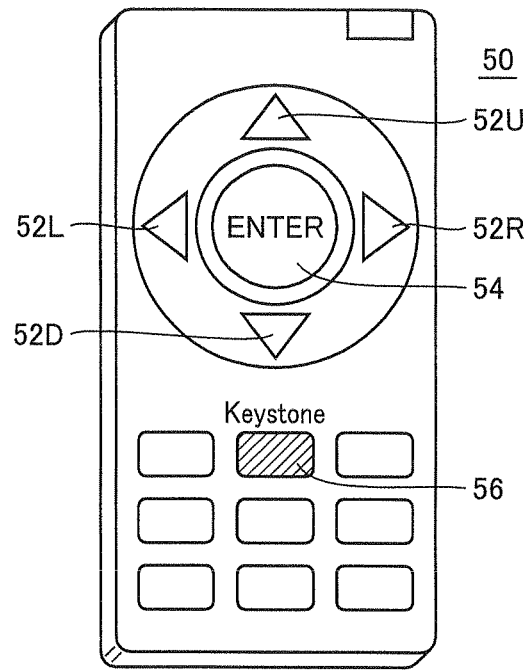
FIG. 3 illustrates a remote controller.

FIG. 3 illustrates remote controller 50. With reference to FIG. 3, remote controller 50 includes adjustment buttons 52U, 52D, 52L, 52R, an Enter button 54, and a Keystone remote controller button 56. The adjustment buttons are an upper adjustment button 52U, a lower adjustment button 52D, a left adjustment button 52L, and a right adjustment button 52R arranged in the form of a cross. In the following description, the four upper, lower, right and left buttons will also collectively be referred to as an adjustment button 52.

When a trapezoidal distortion correction process is performed, adjustment button 52 outputs a vertical operation signal corresponding to upper adjustment button 52U and lower adjustment button 52D, and a horizontal operation signal corresponding to left adjustment button 52L and right adjustment button 52R. The vertical operation signal is associated with an angular parameter for a vertical direction to correct image distortion in the vertical direction. The horizontal operation signal is associated with an angular parameter for a horizontal direction to correct image distortion in the horizontal direction.

As such, when the trapezoidal distortion correction process is performed, the user operates adjustment button 52 to set an angular parameter for the vertical direction and an angular parameter for the horizontal direction. Image distortion correction unit 68 can correct image distortion in accordance with the set angular parameters.

When a corner distortion correction process is performed, adjustment button 52 outputs an upper left corner operation signal corresponding to right adjustment button 52R and lower adjustment button 52D, an upper right corner operation signal corresponding to left adjustment button 52L and lower adjustment button 52D, a lower left corner operation signal corresponding to right adjustment button 52R and upper adjustment button 52U, and a lower right corner operation signal corresponding to left adjustment button 52L and upper adjustment button 52U. The upper left corner operation signal is associated with an amount of displacement introduced at the upper left corner on the screen. The upper right corner operation signal is associated with an amount of displacement introduced at the upper right corner on the screen. The lower left corner operation signal is associated with an amount of displacement introduced at the lower left corner on the screen. The lower right corner operation signal is associated with an amount of displacement introduced at the lower right corner on the screen.

Thus, when the corner distortion correction process is performed, the user operates adjustment button 52 to set by how much amounts an image displayed on screen 30 has its four corners displaced. Image distortion correction unit 68 can correct image distortion in accordance with the amounts set for the four corners for displacement. Image distortion is corrected in a process having a procedure, as described hereinafter.

Initially, the user presses the remote controller 50 Keystone remote controller button 56. In response, an image distortion correction process is selected and started. When the image distortion correction process is selected and started, OSD circuit 72 operates to display an image distortion correction image on the same screen as projected image 40.

Trapezoidal Image Distortion Correction

Image distortion correction unit 68 allows the trapezoidal distortion correction process to be performed, as will be described hereinafter with reference to FIGS. 4 and 5.

Figure 4:
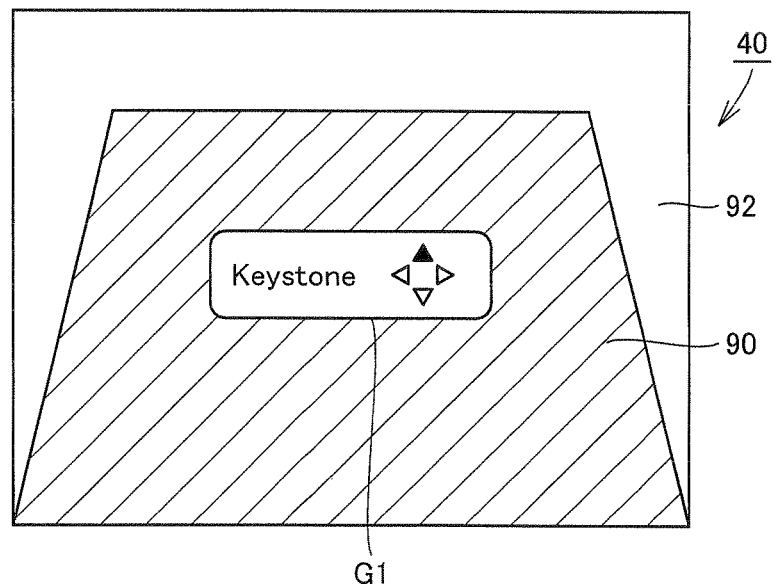
FIGS. 4 and 5 are diagrams for illustrating a trapezoidal distortion correction process performed by an image distortion correction unit.
Figure 5:
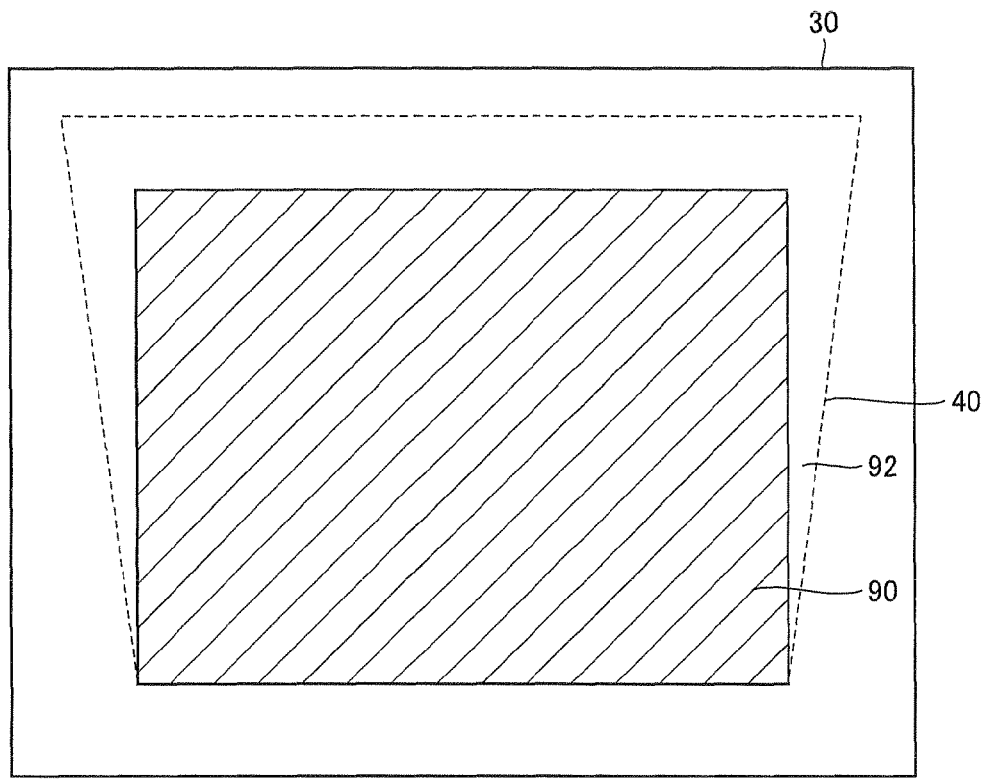

FIG. 4 shows a form of a distorted image formed on each liquid crystal panel when the trapezoidal distortion correction process is performed. With reference to FIG. 4, on the same screen as the distorted image, a trapezoidal distortion correction image G1 is displayed by OSD circuit 72. Trapezoidal distortion correction image G1 displays a type of an operation menu (an image distortion correction menu), and an indicator indicating how adjustment button 52 (FIG. 3) is operated. Hereinafter, a status with trapezoidal distortion correction image G1 displayed will also be referred to as "Keystone OSD displayed".

Upper adjustment button 52U and lower adjustment button 52D are associated with correcting image distortion caused by tilted projection as seen in the vertical direction. In the FIG. 4 example, upper adjustment button 52U is pressed, and accordingly, in image distortion correction image G1, an indicator corresponding to upper adjustment button 52U is turned on (or a color displayed is changed), and the angular parameter for the vertical direction is increased in value in a positive direction and the image has its upper side corrected in a direction allowing the upper side to be smaller than its lower side.

In the embodiment, how many times upper adjustment button 52U is pressed corresponds to the value of the angular parameter for the vertical direction. Image distortion correction unit 68 adjusts an image signal in accordance with the value of the angular parameter for the vertical direction to determine an image formation region in a pixel region of each liquid crystal panel for forming an image (a real image 90) based on the image signal. More specifically, the image data is corrected to: make the image formation region into a trapezoid opposite in direction to projected image 40 so that image distortion is corrected and real image 90 is projected on screen 30 in a normal form; and also minimize the optical transmittance of each pixel included in a region 92 that does not contribute to forming the image. Consequently, as shown in FIG. 5, real image 90 is displayed on screen 30 in the normal form.

On the other hand, although not shown, when the user presses lower adjustment button 52D, an indicator corresponding to lower adjustment button 52D is turned on, and the angular parameter for the vertical direction is increased in value in a negative direction and the image has its lower side corrected in a direction allowing the lower side to be smaller than its upper side.

Furthermore, left adjustment button 52L and right adjustment button 52R are associated with correcting image distortion caused by tilted projection as seen in the horizontal direction. When right adjustment button 52R is pressed, in image distortion correction image G1 an indicator corresponding to right adjustment button 52R is turned on, and the angular parameter for the horizontal direction is increased in value in the positive direction and the image has its right side corrected in a direction allowing the right side to be smaller than its left side. In contrast, when left adjustment button 52L is pressed, in image distortion correction image G1 an indicator corresponding to left adjustment button 52L is turned on, and the angular parameter for the horizontal direction is increased in value in the negative direction and the image has its left side corrected in a direction allowing the left side to be smaller than its right side.

Corner Distortion Correction

Figure 6:
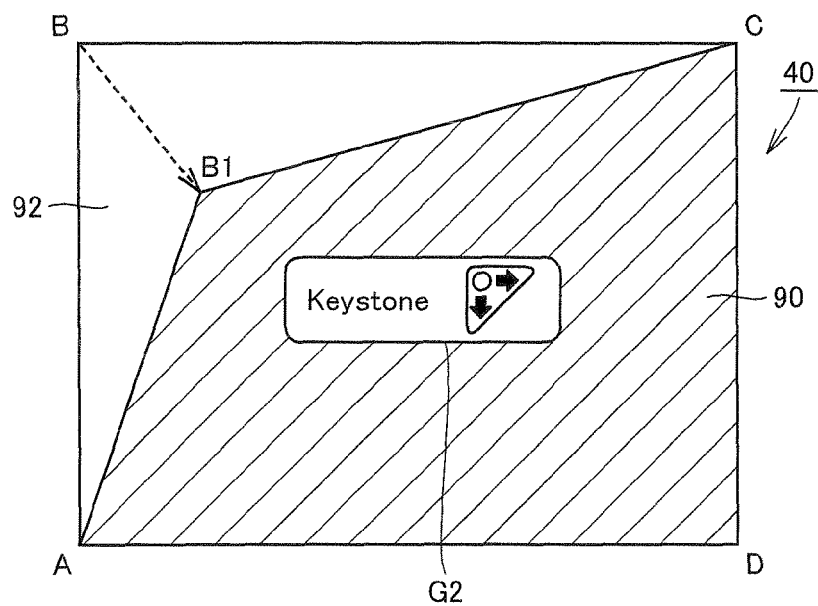
FIG. 6 is a diagram for illustrating a corner distortion correction process performed by the image distortion correction unit.

Image distortion correction unit 68 allows the corner distortion correction process to be performed, as will be described hereinafter with reference to FIG. 6. FIG. 6 shows a form of a distorted image formed on each liquid crystal panel when the corner distortion correction process is performed.

With reference to FIG. 6, on the same screen as the distorted image, a corner distortion correction image G2 is displayed by OSD circuit 72. Corner distortion correction image G2 displays a type of an operation menu (an image distortion correction menu), and an indicator indicating how adjustment button 52 (FIG. 3) is operated. Hereinafter, a status with corner distortion correction image G2 displayed will also be referred to as "Corner OSD displayed".

In the figure, correction points A, B, C, D represent four corners of an image displayed on screen 30. In corner distortion correction, correction points A, B, C, D are positionally corrected in response to an operation signal output from adjustment button 52 (the upper left corner operation signal, the upper right corner operation signal, the lower left corner operation signal, and the lower right corner operation signal) to correct a distortion of an image displayed on screen 30.

In the FIG. 6 example, right adjustment button 52R and lower adjustment button 52D are associated with how correction point B (the upper left corner) is displaced. When the user presses right adjustment button 52R and lower adjustment button 52D, then, in image distortion correction image G2, an indicator corresponding to right adjustment button 52R and lower adjustment button 52D is turned on (or a color displayed is changed).

In the embodiment, how many times right adjustment button 52R and lower adjustment button 52D are pressed corresponds to by how much amount correction point B is displaced. Image distortion correction unit 68 adjusts an image signal, depending on by how much amount correction point B is displaced, to determine an image formation region in a pixel region of each liquid crystal panel for forming an image (real image 90) based on the image signal.

More specifically, image distortion correction unit 68 displaces correction point B in a direction indicated in the figure by an arrow by an amount corresponding to how many times right adjustment button 52R and lower adjustment button 52D are pressed. Correction point B is displaced to a correction point B1. Thus a correction point on screen 30 that corresponds to correction point B1 of real image 90 on each liquid crystal panel is displaced by an amount corresponding to how many times right adjustment button 52R and lower adjustment button 52D are pressed. Thus, the image data is corrected to: displace a correction point of an image formation region for forming real image 90 so that image distortion is corrected and real image 90 is projected on screen 30 in a normal form; and also minimize the optical transmittance of each pixel included in region 92 that does not contribute to forming the image. Consequently, real image 90 is displayed on screen 30 in the normal form.

On the other hand, although not shown, when the user presses left adjustment button 52L and lower adjustment button 52D, then, in corner distortion correction image G2, an indicator corresponding to left adjustment button 52L and lower adjustment button 52D is turned on, and correction point C is displaced by an amount corresponding to how many times left adjustment button 52L and lower adjustment button 52D are pressed.

Furthermore, when the user presses left adjustment button 52L and upper adjustment button 52U, then, in corner distortion correction image G2, an indicator corresponding to left adjustment button 52L and upper adjustment button 52U is turned on, and correction point D is displaced by an amount corresponding to how many times left adjustment button 52L and upper adjustment button 52U are pressed.

Furthermore, when the user presses right adjustment button 52R and upper adjustment button 52U, then, in corner distortion correction image G2, an indicator corresponding to right adjustment button 52R and upper adjustment button 52U is turned on, and correction point A is displaced by an amount corresponding to how many times right adjustment button 52R and upper adjustment button 52U are pressed.

Switching Control Process

Figure 7:
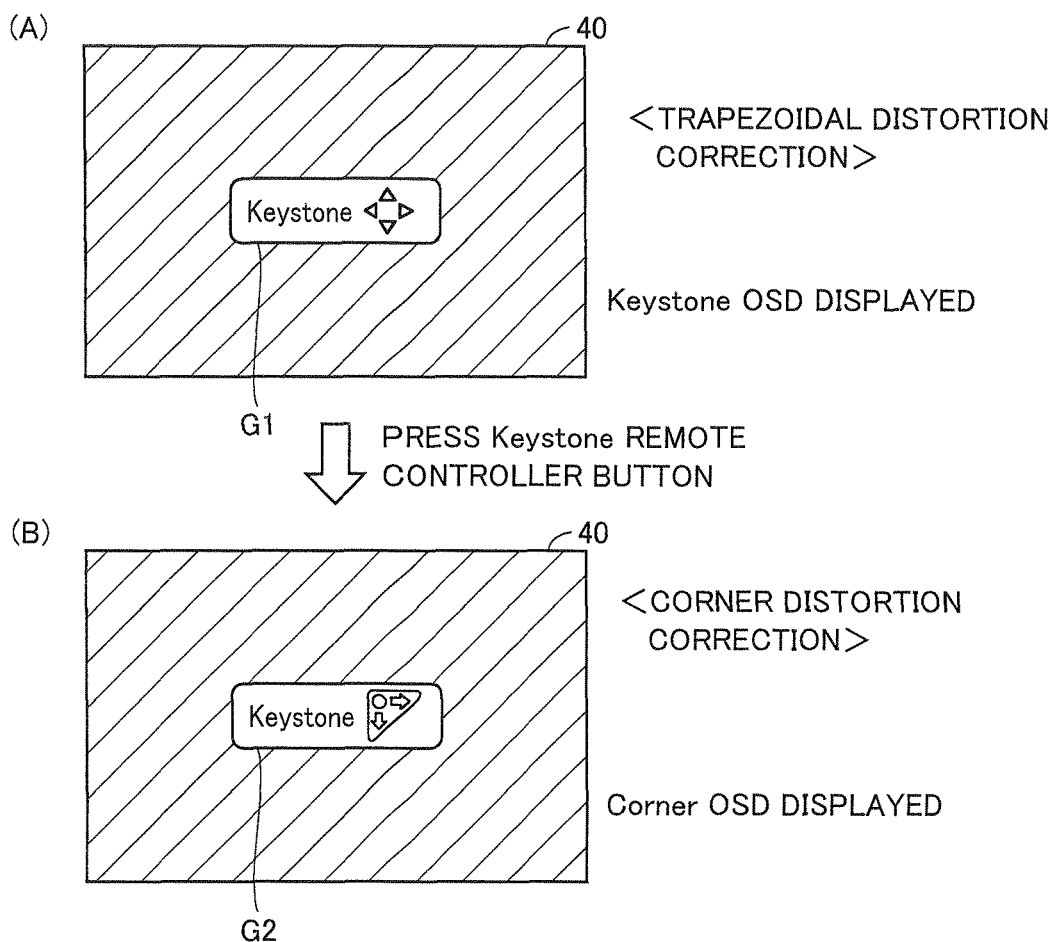
FIG. 7 is a diagram for illustrating how switching from the trapezoidal distortion correction process to the corner distortion correction process is controlled.

The trapezoidal distortion correction process and the corner distortion correction process are switched back and forth, as controlled in a process, as will be described hereinafter with reference to the figures. FIG. 7 is a diagram for illustrating how switching from the trapezoidal distortion correction process to the corner distortion correction process is controlled. The switching control process is performed by microcomputer 70 controlling image distortion correction unit 68.

The switching control process is triggered during the trapezoidal distortion correction process by an instruction received from the user to switch the process to another. In the embodiment, the instruction is an operation signal that remote controller 50 outputs as that the user has pressed the remote controller 50 Keystone remote controller button 56 (FIG. 3) is detected.

Thus, when the trapezoidal distortion correction process is currently performed, and the user also presses Keystone remote controller button 56, image distortion correction unit 68 switches the trapezoidal distortion correction process to the corner distortion correction process.

Note that when the trapezoidal distortion correction process is switched to the corner distortion correction process, OSD circuit 72 switches the image distortion correction image that is displayed on the same screen as projected image 40 from trapezoidal distortion correction image G1 (a Keystone OSD indication) to corner distortion correction image G2 (a Corner OSD indication). In other words, as the trapezoidal distortion correction process is switched to the corner distortion correction process, the Keystone OSD indication is switched to the Corner OSD indication.

Thus the user can operate the remote controller 50 Keystone remote controller button 56 to easily switch the trapezoidal distortion correction process and the corner distortion correction process back and forth.

As described above, switching the trapezoidal distortion correction process and the corner distortion correction process back and forth is enhanced in operability. However, for example during the trapezoidal distortion correction process if the user inadvertently presses Keystone remote controller button 56 the trapezoidal distortion correction process would be suddenly switched to the corner distortion correction process against the user's intention.

To prevent such disadvantage, image distortion correction unit 68 switches the trapezoidal distortion correction process and the corner distortion correction process back and forth when the trapezoidal distortion correction process or the corner distortion correction process is not performed and the user presses Keystone remote controller button 56.

In the FIG. 7 example, while the corner distortion correction process has been switched to the trapezoidal distortion correction process, the trapezoidal distortion correction process is in effect not performed. In that condition when the user presses Keystone remote controller button 56 image distortion correction unit 68 switches the trapezoidal distortion correction process and the corner distortion correction process back and forth.

Furthermore, when the corner distortion correction process or the trapezoidal distortion correction process has been performed and the user presses Keystone remote controller button 56, image distortion correction unit 68 prohibits switching the trapezoidal distortion correction process and the corner distortion correction process back and forth.

Figure 8:
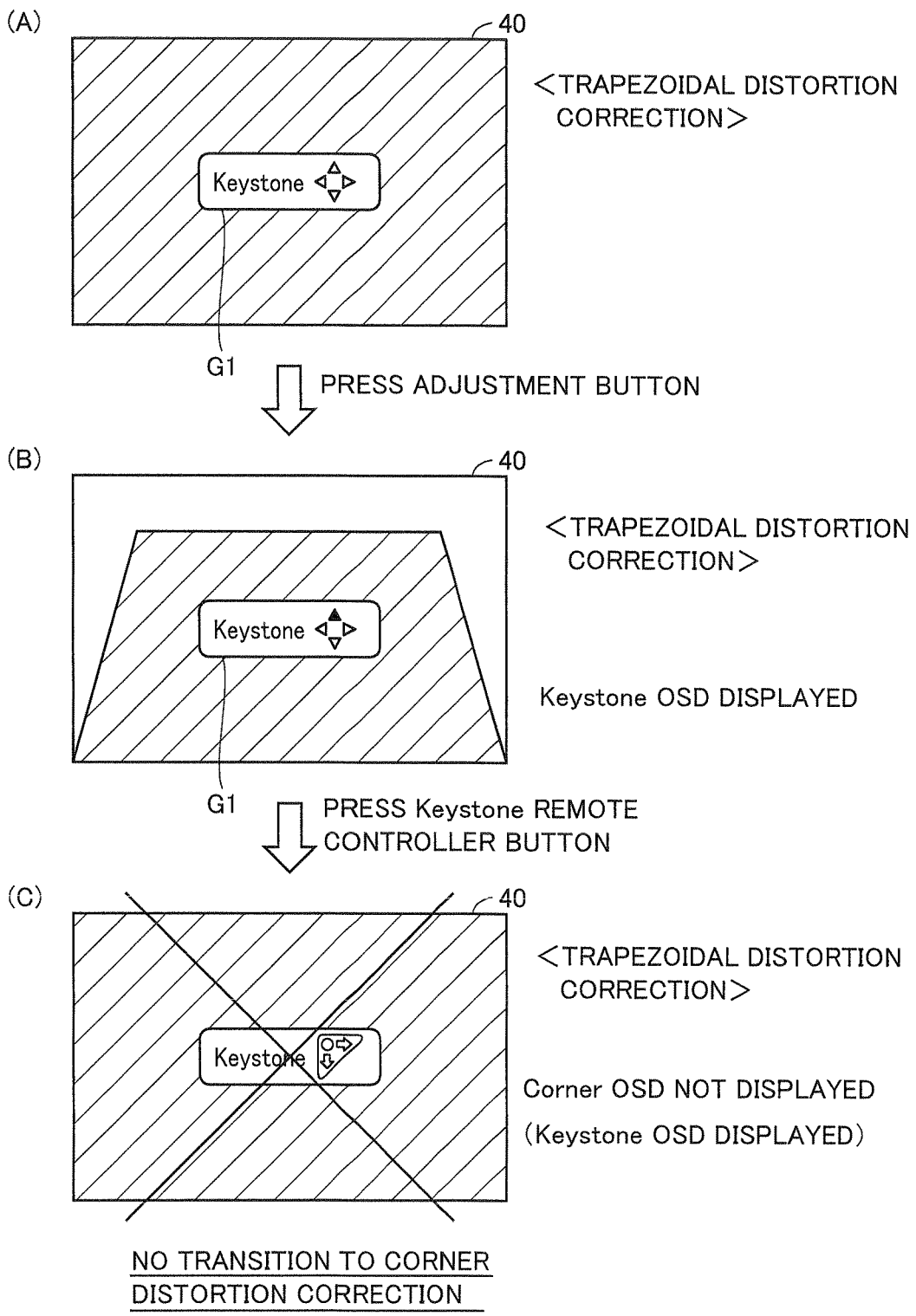
FIG. 8 is a diagram for illustrating a process for controlling how the trapezoidal distortion correction process and the corner distortion correction process are switched.

In the FIG. 8 example, after the corner distortion correction process is switched to the trapezoidal distortion correction process (FIG. 8(A)), the user operates adjustment button 52 and, in response, the trapezoidal distortion correction process is performed (FIG. 8(B)). In this condition when the user presses Keystone remote controller button 56 image distortion correction unit 68 does not switch the trapezoidal distortion correction process and the corner distortion correction process back and forth (FIG. 8(C)). In other words, image distortion correction unit 68 does not transition to the corner distortion correction process, and continues to perform the trapezoidal distortion correction process. Accordingly, the Keystone OSD indication is maintained as the image distortion correction image displayed on the same screen as projected image 40.

Figure 9:
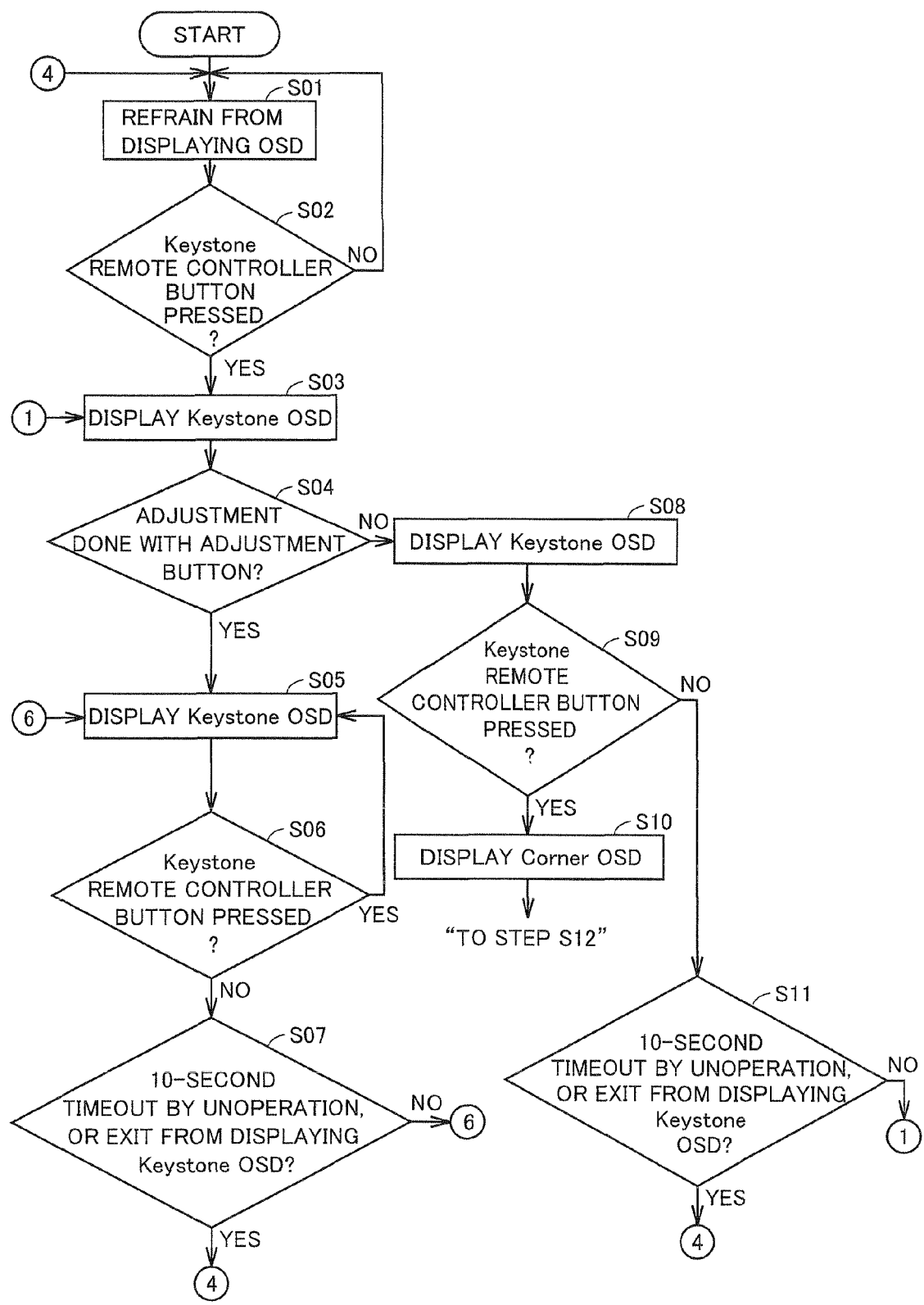
FIG. 9 and FIG. 10 are a flowchart for illustrating a process according to the embodiment of the present invention for controlling how the trapezoidal distortion correction process and the corner distortion correction process are switched.
Figure 10:
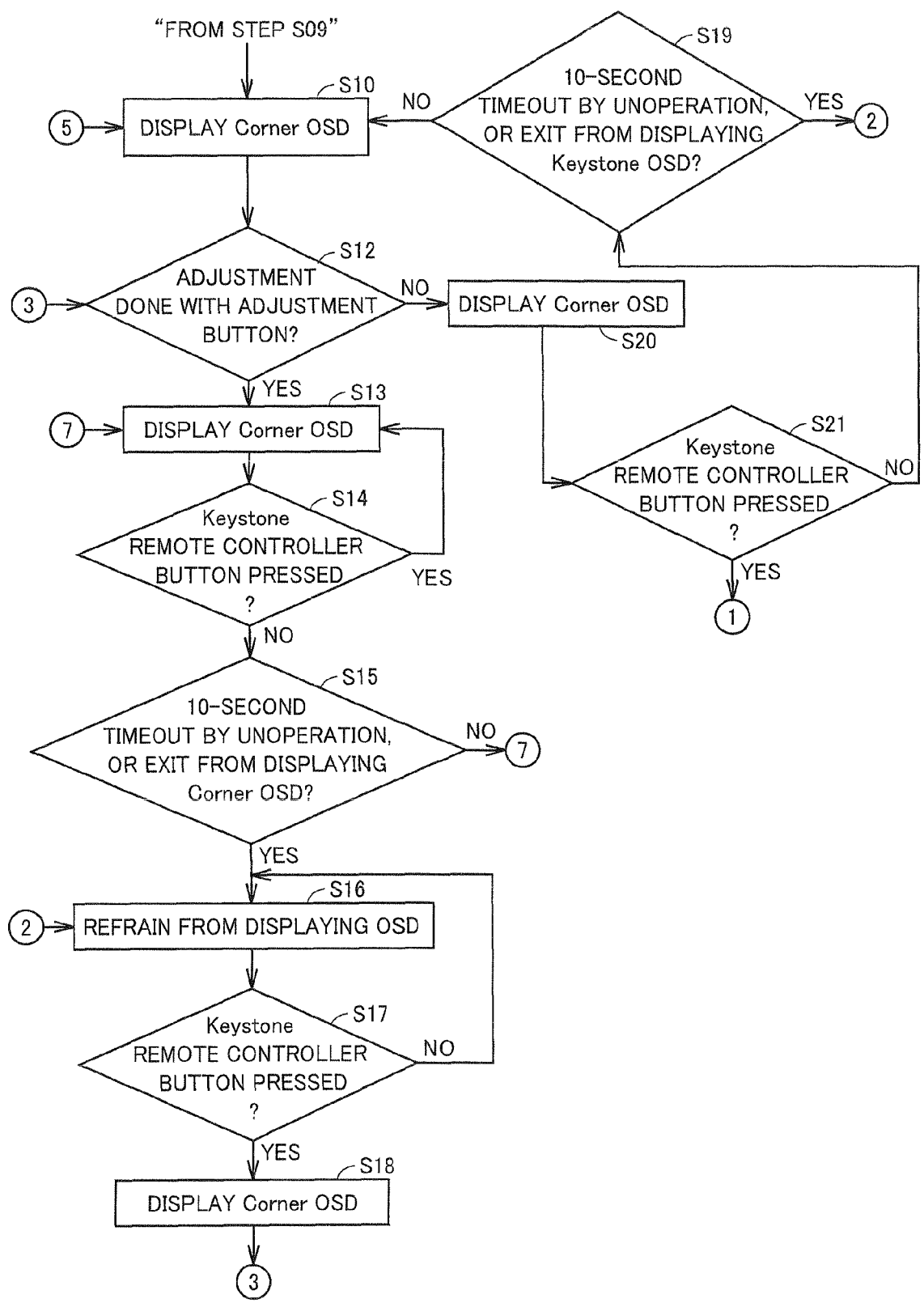

The above process can be summarized as a process flow represented in FIG. 9 and FIG. 10.

Process Flow

FIG. 9 and FIG. 10 are a flowchart for illustrating a process according to the embodiment of the present invention for controlling how the trapezoidal distortion correction process and the corner distortion correction process are switched back and forth. Note that the FIG. 9 and FIG. 10 process has each step implemented by microcomputer 70 performing a previously stored program.

With reference to FIG. 9, initially, as an initial status, the image distortion correction process is not selected, i.e., the user does not press Keystone remote controller button 56 and accordingly, OSD circuit 72 does not operate to display the image distortion correction image by an OSD indication, for the sake of illustration (step S01).

Then, microcomputer 70 determines from a remote controller signal received by remote controller signal reception unit 20 (FIG. 1) whether Keystone remote controller button 56 (FIG. 3) has been pressed (step S02). If not (NO at S02), the control returns to the top of the process.

If microcomputer 70 determines that Keystone remote controller button 56 has been pressed (YES at S02), image distortion correction unit 68 is instructed by microcomputer 70 to select the trapezoidal distortion correction process (step S03). OSD circuit 72 is instructed by microcomputer 70 to generate trapezoidal distortion correction image G1 (FIG. 4). Thus, trapezoidal distortion correction image G1 is displayed on the same screen as projected image 40 (the Keystone OSD displayed).

Microcomputer 70 then determines from a remote controller signal whether the user has operated adjustment button 52 (FIG. 3), i.e., whether the trapezoidal distortion correction process has been performed (step S04). If so (YES at step S04), image distortion correction unit 68 is instructed by microcomputer 70 to select the trapezoidal distortion correction process (step S05). OSD circuit 72 is instructed by microcomputer 70 to generate trapezoidal distortion correction image G1. Thus trapezoidal distortion correction image G1 is displayed on the same screen as projected image 40 (the Keystone OSD displayed).

Microcomputer 70 then determines from a remote controller signal whether Keystone remote controller button 56 has been pressed (step S06). If so (YES at S06), image distortion correction unit 68 returns to step S05, and is instructed by microcomputer 70 to select the trapezoidal distortion correction process. OSD circuit 72 is instructed by microcomputer 70 to generate trapezoidal distortion correction image G1. Thus, trapezoidal distortion correction image G1 is displayed on the same screen as projected image 40 (the Keystone OSD displayed).

If microcomputer 70 determines that Keystone remote controller button 56 is not pressed (NO at S06), microcomputer 70 determines whether adjustment button 52 and Keystone remote controller button 56 have been unoperated for more than a predetermined period of time (e.g., of 10 seconds) since adjustment button 52 was operated at step S04, or whether an instruction has been received from the user operating Enter key 54 (FIG. 3) or the like to end the trapezoidal distortion correction process (step S07). If not (NO at step S07), the control returns to step S05, and image distortion correction unit 68 is instructed by microcomputer 70 to select the trapezoidal distortion correction process. OSD circuit 72 operates to display trapezoidal distortion correction image G1 on the same screen as projected image 40 (the Keystone OSD displayed).

If adjustment button 52 and Keystone remote controller button 56 are unoperated for more than the predetermined period of time or an instruction has been received to end the trapezoidal distortion correction process (YES at step S07), the control returns to step S01, and the initial status with the image distortion correction process unselected is set.

In contrast, if in step S04 microcomputer 70 determines that the user does not operate adjustment button 52 (NO at step S04), image distortion correction unit 68 is instructed by microcomputer 70 to select the trapezoidal distortion correction process (step S08). OSD circuit 72 operates to display trapezoidal distortion correction image G1 on the same screen as projected image 40 (the Keystone OSD displayed).

Then, microcomputer 70 determines from a remote controller signal whether Keystone remote controller button 56 has been pressed (step S09). If so (YES at S09), image distortion correction unit 68 is instructed by microcomputer 70 to select the corner distortion correction process (step S10). OSD circuit 72 is instructed by microcomputer 70 to generate corner distortion correction image G2. Thus, corner distortion correction image G2 is displayed on the same screen as projected image 40 (the Corner OSD displayed).

If microcomputer 70 determines that Keystone remote controller button 56 is not pressed (NO at S09), microcomputer 70 determines whether adjustment button 52 and Keystone remote controller button 56 have been unoperated for more than a predetermined period of time since adjustment button 52 was operated at step S04, or whether an instruction has been received from the user operating Enter key 54 or the like to end the trapezoidal distortion correction process (step S11). If not (NO at step S11), the control returns to step S03, and image distortion correction unit 68 is instructed by microcomputer 70 to select the trapezoidal distortion correction process. OSD circuit 72 operates to display trapezoidal distortion correction image G1 on the same screen as projected image 40 (the Keystone OSD displayed).

If adjustment button 52 and Keystone remote controller button 56 are unoperated for more than the predetermined period of time or an instruction has been received to end the trapezoidal distortion correction process (YES at step S07), the control returns to step S01, and the initial status with the image distortion correction process unselected is set.

Then, with reference to FIG. 10, in FIG. 9 at step S10 image distortion correction unit 68 selects the corner distortion correction process, and microcomputer 70 determines from a remote controller signal whether the user has operated adjustment button 52 (FIG. 3), i.e., whether the corner distortion correction process has been performed (step S12). If so (YES at step S12), image distortion correction unit 68 is instructed by microcomputer 70 to select the corner distortion correction process (step S13). OSD circuit 72 operates to display corner distortion correction image G2 on the same screen as projected image 40 (the Corner OSD displayed).

Then, microcomputer 70 determines from a remote controller signal whether Keystone remote controller button 56 has been pressed (step S14). If so (YES at S14), image distortion correction unit 68 returns to step S13 and is instructed by microcomputer 70 to select the corner distortion correction process. OSD circuit 72 operates to display corner distortion correction image G2 on the same screen as projected image 40 (the Corner OSD displayed).

If microcomputer 70 determines that Keystone remote controller button 56 is not pressed (NO at S14), microcomputer 70 determines whether adjustment button 52 and Keystone remote controller button 56 have been unoperated for more than a predetermined period of time since adjustment button 52 was operated at step S12, or whether an instruction has been received from the user operating Enter key 54 or the like to end the corner distortion correction process (step S15). If not (NO at step S15), the control returns to step S13, and image distortion correction unit 68 is instructed by microcomputer 70 to select the corner distortion correction process. OSD circuit 72 operates to display corner distortion correction image G2 on the same screen as projected image 40 (the Corner OSD displayed).

If adjustment button 52 and Keystone remote controller button 56 are unoperated for more than the predetermined period of time or an instruction has been received to end the corner distortion correction process (YES at step S15), the initial status with the image distortion correction process unselected is set. In other words, OSD circuit 72 does not operate to display any image distortion correction image in the OSD indication (step S16).

In this initial status, microcomputer 70 determines from a remote controller signal whether Keystone remote controller button 56 has been pressed (step S17). If so (YES at S17), image distortion correction unit 68 is instructed by microcomputer 70 to select the corner distortion correction process (step S18). OSD circuit 72 operates to display corner distortion correction image G2 on the same screen as projected image 40 (the Corner OSD displayed). Subsequently the control returns to step S12.

If microcomputer 70 determines that Keystone remote controller button 56 is not pressed (NO at step S17), the control returns to step S16 and the initial status is set.

If in step S12 microcomputer 70 determines that the user does not operate adjustment button 52 (NO at step S12), image distortion correction unit 68 is instructed by microcomputer 70 to select the corner distortion correction process (step S20). OSD circuit 72 operates to display corner distortion correction image G2 on the same screen as projected image 40 (the Corner OSD displayed).

Then, microcomputer 70 determines from a remote controller signal whether Keystone remote controller button 56 has been pressed (step S21). If so (YES at S21), the control returns to step S03, and image distortion correction unit 68 is instructed by microcomputer 70 to select the trapezoidal distortion correction process. OSD circuit 72 operates to display trapezoidal distortion correction image G1 on the same screen as projected image 40 (the Keystone OSD displayed).

If microcomputer 70 determines that Keystone remote controller button 56 is not pressed (NO at S21), microcomputer 70 determines whether adjustment button 52 and Keystone remote controller button 56 have been unoperated for more than a predetermined period of time since adjustment button 52 was operated at step S09, or whether an instruction has been received from the user operating Enter key 54 or the like to end the corner distortion correction process (step S19). If not (NO at step S19), the control returns to step S10, and image distortion correction unit 68 is instructed by microcomputer 70 to select the corner distortion correction process. OSD circuit 72 operates to display corner distortion correction image G2 on the same screen as projected image 40 (the Corner OSD displayed).

If adjustment button 52 and Keystone remote controller button 56 are unoperated for more than the predetermined period of time or an instruction has been received to end the corner distortion correction process (YES at step S19), the control proceeds to step S16, the initial status with the image distortion correction process unselected is set.

As described above, the present invention in the embodiment provides a projector including as image distortion correction functions a trapezoidal distortion correction function and a corner distortion correction function, that allows the trapezoidal distortion correction function and the corner distortion correction function to be easily switched back and forth by pressing an operation button of a remote controller. Furthermore, when any of the correction functions is executed to perform correction, and the operation button is also pressed, switching from the function to the other is prohibited. This can resolve such failure and cumbersomeness caused when the user inadvertently presses the operation button. A projection image display apparatus enhanced in operability can thus be obtained.

Exemplary Variation

In the embodiment of the present invention as described above, as shown in FIG. 8, when a user operates adjustment button 52 to perform the trapezoidal distortion correction process, and, with the trapezoidal distortion correction process performed, the user presses Keystone remote controller button 56, the trapezoidal distortion correction process is not switched to the corner distortion correction process, for the sake of illustration. As another example, when the user presses Keystone remote controller button 56, OSD circuit 72 may in response operate to display an image on the same screen for encouraging the user to select switching one function to the other. This can also provide a similar effect.

Figure 11:
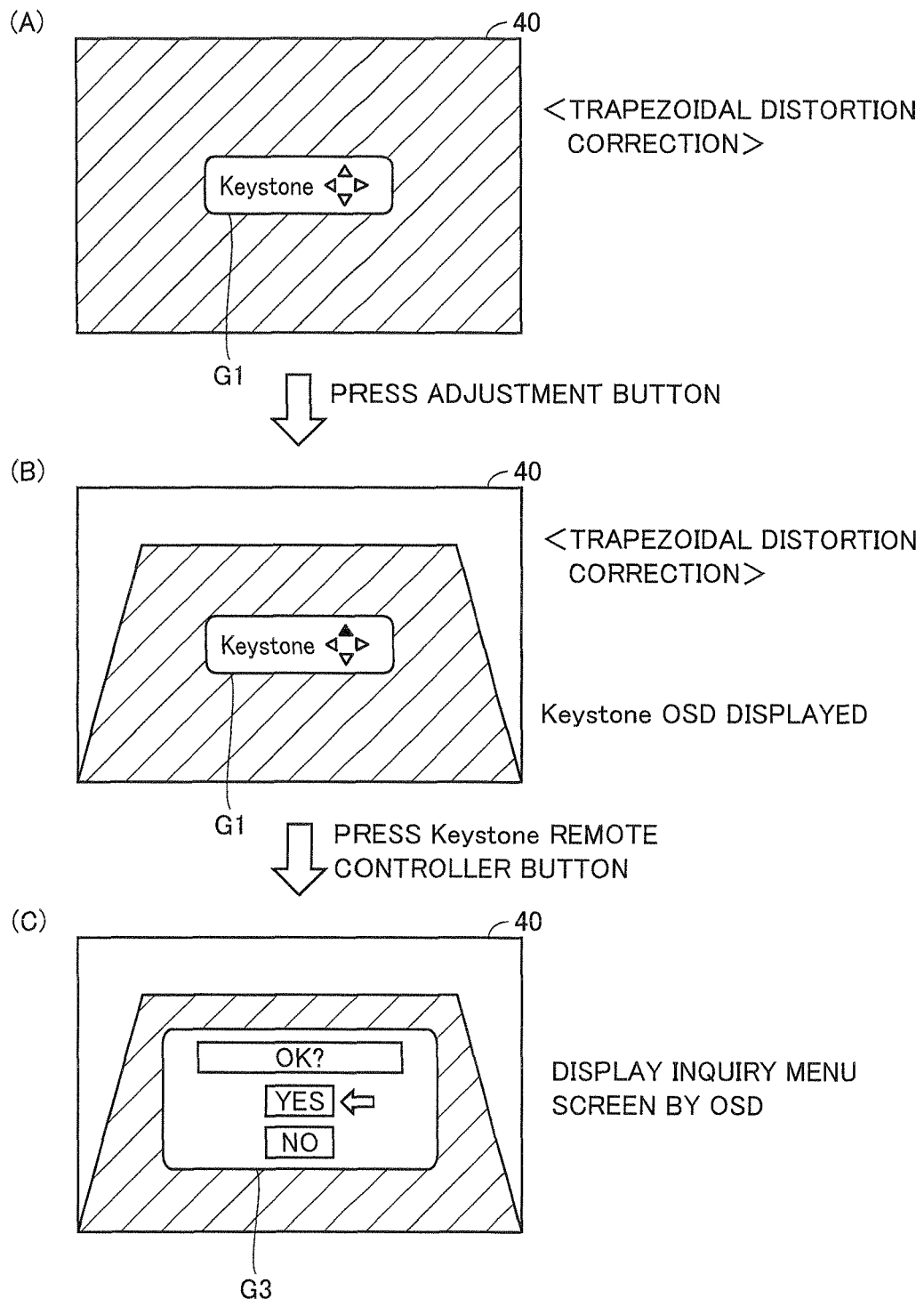
FIG. 11 is a diagram for illustrating a process according to the embodiment of the present invention in an exemplary variation for controlling how the trapezoidal distortion correction process and the corner distortion correction process are switched.

FIG. 11 is a diagram for illustrating a process according to the embodiment of the present invention in the exemplary variation for controlling how the corner distortion correction process and the trapezoidal distortion correction process are switched back and forth.

With reference to FIG. 11, after the corner distortion correction process is switched to the trapezoidal distortion correction process (FIG. 11(A)), the user operates adjustment button 52, and, in response, the trapezoidal distortion correction process is performed (FIG. 11(B)). In this condition when the user presses Keystone remote controller button 56 OSD circuit 72 is instructed by microcomputer 70 to operate to display an inquiry menu screen G3 on the same screen for encouraging the user to select switching the process to the other. In the FIG. 11(C) example, an OSD image is displayed to encourage the user to select whether switching to the corner distortion correction process should be done. The user can operate a key of remote controller 50 to move a cursor (an arrow shown in the figure) that is displayed on inquiry menu screen G3 to one of "YES" and "NO", and thereafter press Enter key 54 to select whether to switch the process to the other. This can prevent suddenly switching from the trapezoidal distortion correction process to the corner distortion correction process when the user inadvertently presses Keystone remote controller button 56.

While the present embodiment has been described for a projector provided in the form of a liquid crystal projector, the present invention is not limited thereto. For example, the present invention is applicable to a projector in a digital light processing (DLP)® system or a similar, different system.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A projection image display apparatus comprising:
   an image signal processing unit which receives and converts a first image signal to generate a second image signal representing an image to be projected;
   an image distortion correction unit which adjusts said second image signal to correct a distortion of a projected image; and
   an input operation unit which operates in response to an operation done by a user to output an operation signal associated with an image distortion correction process, said image distortion correction unit including:
      a first image distortion correction unit which adjusts said second image signal responsively when a correction point on the projected image is changed;
      a second image distortion correction unit which adjusts said second image signal responsively when an angular parameter associated with a projection angle of the projection image display apparatus is changed;
      a switching unit which operates in response to a first operation signal output from said input operation unit to switch correction provided by said first image distortion correction unit and correction provided by said second image distortion correction unit back and forth;
      a determination unit which determines whether any one of the correction by said first image distortion correction unit and the correction by said second image distortion correction unit has been performed; and
      a prohibition unit which prohibits switching said first image distortion correction unit and said second image distortion correction unit back and forth if said determination unit determines that any one of the correction by said first image distortion correction unit and the correction by said second image distortion correction unit has been performed and said first operation signal is also received from said input operation unit.

2. The projection image display apparatus according to claim 1, wherein said switching unit switches said first image distortion correction unit and said second image distortion correction unit back and forth if said determination unit determines that neither one of the correction by said first image distortion correction unit and the correction by said second image distortion correction unit is performed and said first operation signal is received from said input operation unit.

3. The projection image display apparatus according to claim 1, wherein:
   said input operation unit operates in response to an operation done by the user to output a second operation signal associated with one of said correction point and said angular parameter; and
   said determination unit determines that said any one of the correction by said first image distortion correction unit and the correction by said second image distortion correction unit has been performed when said second operation signal is received within a predetermined period of time as counted from a temporal point at which said switching was done.

* * * * *